United States Patent [19]

Iwabuchi et al.

[11] 4,323,620
[45] Apr. 6, 1982

[54] MULTILAYER HEAT INSULATOR

[75] Inventors: Suminobu Iwabuchi; Kazumasa Matsui, both of Takatsuki, Japan

[73] Assignee: Yuasa Battery Company Limited, Osaka, Japan

[21] Appl. No.: 121,908

[22] Filed: Feb. 15, 1980

Related U.S. Application Data

[63] Continuation-in-part of Ser. No. 51,455, Jun. 22, 1979, abandoned.

[30] Foreign Application Priority Data

Jun. 30, 1978 [JP] Japan .................................. 53/80812

[51] Int. Cl.³ .......................... B32B 7/02; B32B 15/14
[52] U.S. Cl. ..................................... 428/215; 220/450; 220/452; 428/285; 428/332; 428/340; 428/432; 428/457; 428/900
[58] Field of Search ............... 428/215, 332, 920, 921, 428/392, 457, 432, 902, 285; 220/415, 450, 452

[56] References Cited

U.S. PATENT DOCUMENTS

3,009,601 11/1961 Matsch ................................. 428/138
3,265,236 8/1966 Gibbon et al. ...................... 220/450
3,346,016 10/1967 Blau et al. ........................... 220/450
3,595,728 7/1971 Robson ................................ 220/451

Primary Examiner—Paul J. Thibodeau
Attorney, Agent, or Firm—Watson, Cole, Grindle & Watson

[57] ABSTRACT

The invention relates to multilayer heat insulators wherein gas-impermeable layers each made of a metal foil of one member selected from the group consisting of aluminum, nickel and stainless steel and gas-containing layers each made of at least one member selected from the group consisting of glass fiber, asbestos fiber, mineral fiber, ceramic fiber, carbon fiber, silica powder, alumina powder and zirconia powder in the form of wool, paper or mat are laminated alternately so that the same layers do not contact each other. The thickness of the gas-impermeable layer is 10 to 20 μm, the thickness of the gas-containing layer is 0.3 to 1.8 mm and its porosity is 0.98 to 0.95 to make the thermal conductivity of this laminated multilayer heat insulator about 0.02 kcal/mh° C. (200° C.) so that the behavior of the contained gas may be as small as possible, the thermal conduction may be prevented and the heat insulating performance may be improved.

4 Claims, 11 Drawing Figures

MULTILAYER HEAT INSULATOR

CROSS REFERENCE TO RELATED APPLICATION

This application is a continuation-in-part of application Ser. No. 51,455 filed on June 22, 1979 and now abandoned.

BACKGROUND OF THE INVENTION

1. Field of the Invention

This invention relates to heat insulators and more particularly to a multilayer heat insulator to make the behavior of the contained gas as small as possible, to prevent thermal conduction and to improve the thermal insulating performance.

2. Description of the Prior Art

In the thermal conduction of a generally used heat insulator (used at a temperature of 100° to 500° C.), a thermal conduction through the component solids and a thermal conduction by the gas contained between the component solids are generated in a complex manner. In order to improve the heat insulating performance of such a heat insulator, it is necessary first to select a substance low in the thermal conductivity for the solids forming the heat insulator and second to utilize air which has a most convenient to the ordinary use and is high heat insulation. For example, in the case of glass wool heat insulator used as a fiber type heat insulator, though the thermal conductivity of the glass fiber itself is generally about 0.89 kcal/mh° C. (at room temperature), by its collection and combination, it will show such remarkably favorable heat insulating performance as a thermal conductivity of about 0.03 kcal/mh° C. (at room temperature) at a bulk density of about 0.03 g/cm$^3$. Such tendency is also the same in rock-wool, asbestos and the like. In a porous type heat insulator, the heat insulating performance varies with the structure and shape of the porous material.

It is also necessary to prevent radiant heat transfer. Particularly, in the case of a large amount of the contained gas, in case the ambient temperature rises, radiant heat transfer will also tend to increase. In order to make the thermal conduction of the contained gas (for example, air) used as a heat insulator as small as possible, it is necessary to determine the bulk density of the entire structure. It is generally determined by the thermal characteristics (such as the heat insulating performance and temperature characteristic) and using conditions (such as the weight, volume and price) of the component material. Therefore, in order to further improve the heat insulating performance, the behavior of the gas (for example, air) contained between the component solids is an important factor. The conventional fiber type or porous type heat insulator has a great defect in that the contained gas (for example, air) directly becomes a medium of thermal radiation.

SUMMARY OF THE INVENTION

An object of the present invention is to provide a multilayer heat insulator to make the behavior of the gas (for example, air) contained in the thermal insulating layers as small as possible and to prevent the thermal conduction.

In order to attain such object, the present invention is characterised by alternately overlapping foils having a gas-impermeability and thermal insulating layers having a gas-containability. The present invention shall be explained in detail in the following with reference to the drawings and embodiments.

DETAILED DESCRIPTION OF PREFERRED EMBODIMENTS

Figure 1:
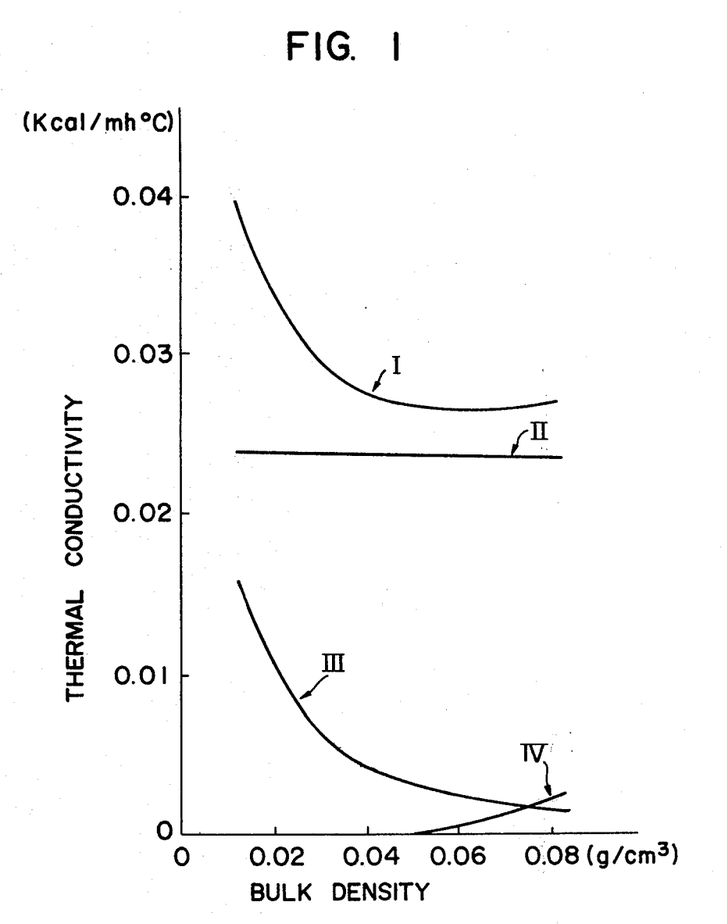
FIG. 1 is a curve diagram showing the rates of thermal conductivity of the gas conduction, thermal conductivity of the solid conduction and thermal conductivity of radiant heat occupied in the total thermal conductivity in a glass wool heat insulator.

In FIG. 1, the abscissa represents the bulk density (in g/cm$^3$) of glass wool, the ordinate represents the thermal conductivity (in kcal/mh° C.) of the same, I is a total thermal conductivity curve, II is a thermal conductivity curve for gas conduction, III is a thermal conductivity curve for radiant heat and IV is a thermal conductivity curve for solid conduction. As seen from FIG. 1, when the bulk density is increased (particularly not less than about 0.04 g/cm$^3$), the radiant heat is greatly reduced and the conductive heat directly by the solid conduction will gradually increase but the conductive heat by the gas conduction will occupy not less than about 80% of the total thermal conduction. Therefore, the way to reduce the thermal conduction is to determine the optimum bulk density and prevent thermal conductive heat by gas conduction.

In order to further improve the heat insulating performance of a high temperature heat insulator, it is necessary to eliminate the thermal conduction of the gas by evacuating the heat insulating layer, or to select the optimum bulk density (and porosity) of the component material within the heat insulating layer and to reduce the thermal conduction path of the gas. However, when the heat insulator to be used by evacuating the heat insulating layer is used at a high temperature (not less than 300° to 500° C.), there will be the following defects:

First, the heat loss escaping through the container (outer and inner containers) vacuum will become large. Second, it will be very difficult to maintain a high vacuum at a high temperature. Third, the component material will be limited at a high temperature. Therefore, by the above, it is very difficult to apply a vacuum heat insulator.

Figure 2:
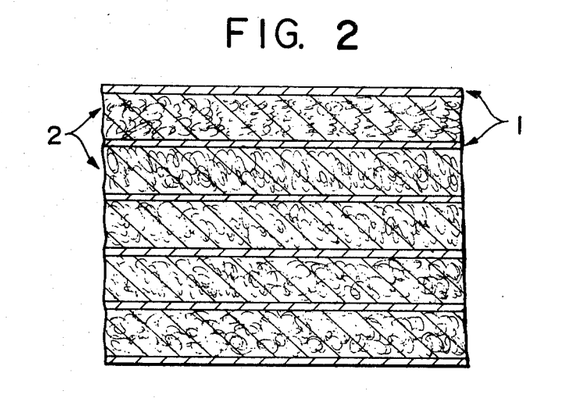
FIG. 2 is a sectioned view of an essential part of a multilayer heat insulator according to an embodiment of the present invention.

The present invention is an improvement having as an object to select the optimum bulk density (and porosity) of a component material within a heat insulating layer and to reduce the thermal conduction path of a gas. In FIG. 2 which is a sectioned view of an essential part of a multilayer heat insulator of an embodiment of the present invention, 1 is such a gas (for example, air)-impermeable layer as, for example, an aluminum layer and 2 is such a gas (for example, air)-containing layer as, for example, a layer made of glass wool. Such gas-impermeable layers 1 and gas-containing layers 2 are alternately overlapped on each other to form a heat insulator so that the same layers do not contact each other. The behavior of the contained gas is made as small as possible by enclosing the gas contained within the heat insulating layer with a foil layer.

As a result, the thermal conduction path (in the direction at right angles with the combined layer) of the gas will become narrow, the gas (air)-impermeable layer becomes a thermal resistance, the thermal conduction of the gas reduces and the heat insulating performance can be improved. The remaining heat loss is of thermal conduction of the solid by the mechanical contact between the component materials.

In the present invention, the thickness of the heat insulating layer and the thickness of the foil layer are important elements. In order to investigate the heat insulating performance, the following thermal characteristic test was made. In this test, an aluminum foil was used as a gas-impermeable layer and glass wool was used as a gas containing layer.

Figure 3:
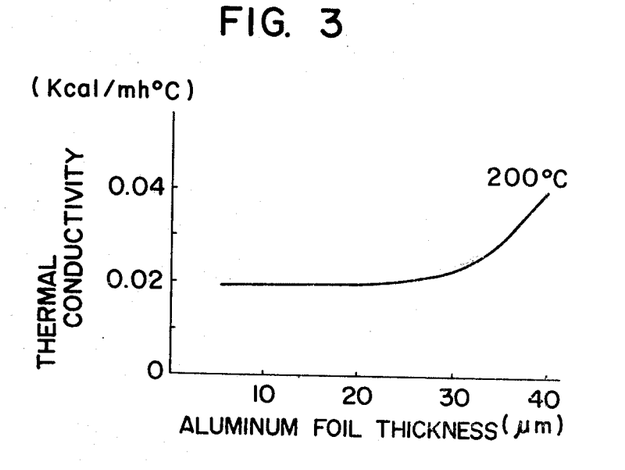
FIG. 3 is a characteristic curve diagram showing the correlation between the thickness and thermal conductivity of a foil layer having gas-impermeability.

In FIG. 3, the abscissa represents the thickness (in $\mu m$) of the aluminum foil and the ordinate represents the thermal conductivity (in kcal/mh° C.). The correlation is graphed at a testing temperature of 200° C. by making the thickness of the glass wool constant at 0.4 mm. As understood from this result, the thickness of the aluminum foil may be about 5 20 $\mu m$ in order to make the thermal conductivity about 0.02 kcal/mh° C. (200° C.).

Figure 4:
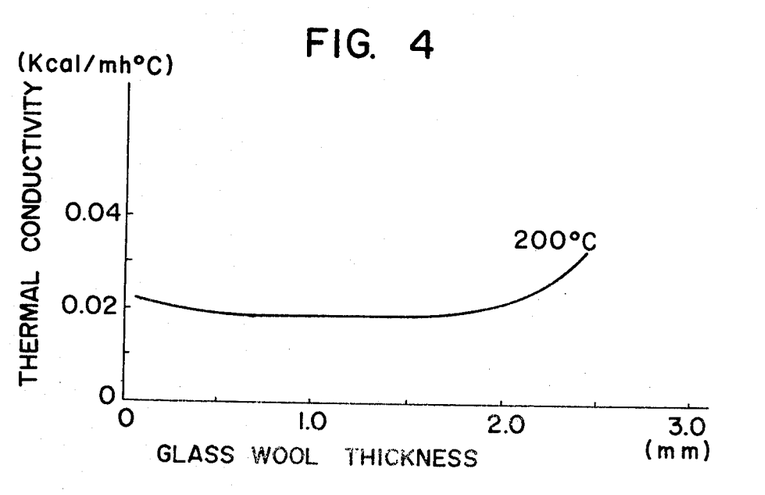
FIG. 4 is a characteristic curve diagram showing the correlation between the thickness and thermal conductivity of a heat insulating layer capable of containing a gas.

In FIG. 4, the abscissa represents the thickness (in mm) of glass wool and the ordinate represents its thermal conductivity (in kcal/mh° C.). The correlation is graphed at a testing temperature of 200° C. by making the thickness of the aluminum foil constant at 15 $\mu m$. As understood from this result, the thickness of the glass wool may be 0.3 to 1.8 mm in order to make the thermal conductivity about 0.02 kcal/mh° C.

Figure 5:
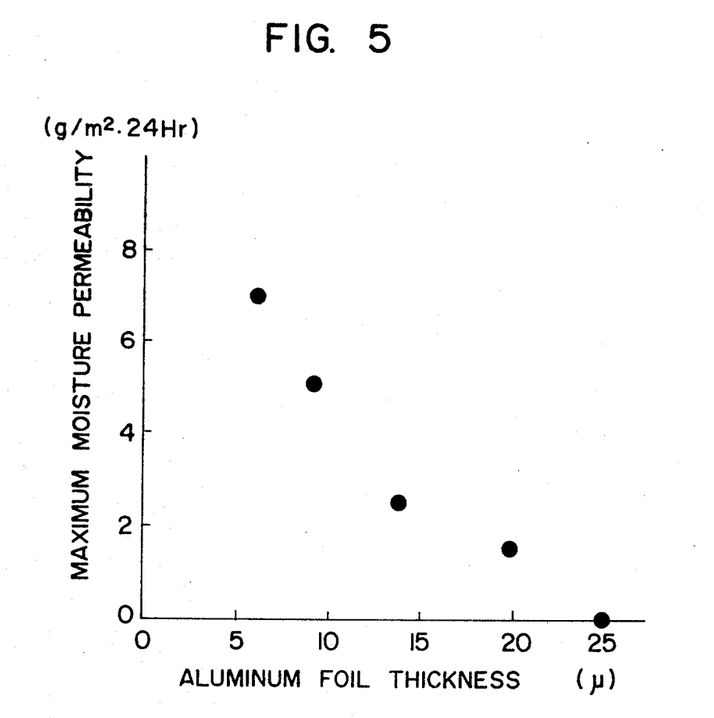
FIG. 5 is a diagram showing the correlation between the thickness and maximum moisture permeability of an aluminum foil.

In investigating the gas (air)-permeability of an aluminum foil as compared with the generally known moisture-permeability, it is found that a low value of the moisture-permeability is an important factor in selecting an aluminum foil in practice. The relation between the thickness and maximum moisture-permeability of an aluminum foil generally known as an industrial material is shown in FIG. 5. The abscissa represents the thickness (in $\mu m$) of the aluminum foil and the ordinate represents its maximum moisture-permeability (in b/m² for 24 hours). As understood from the graph, the thickness of the aluminum foil is not required to be not less than 25 $\mu m$. In case it is considered that the ambient temperature of the multilayer heat insulator in the present invention is 300° to 500° C., the range of 10 20 $\mu m$ is preferable.

Figure 6:
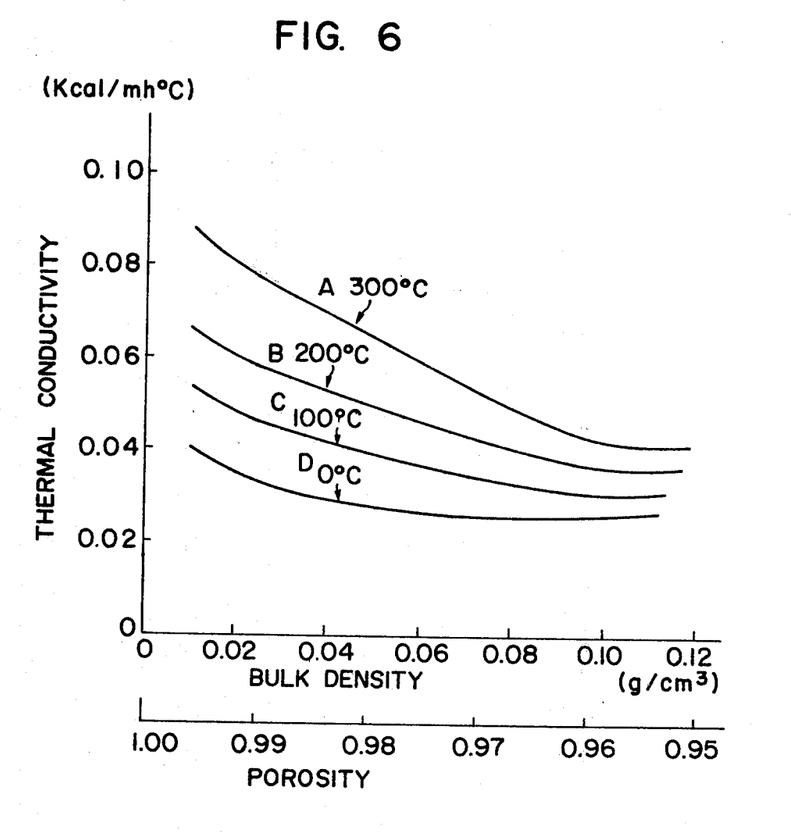
FIG. 6 is a characteristic curve diagram showing the correlations among the thermal conductivity, bulk density and porosity of a glass wool heat insulator when the ambient temperature is varied.

The relations among the thermal conductivity, bulk density and porosity when the ambient temperature of a glass wool heat insulator was varied to be 300°, 200°, 100° and 0° C. in order to investigate the gas content (porosity) in a gas (air)-containing layer are shown in FIG. 6. The upper abscissa represents the bulk density (in g/cm³), the lower abscissa represents the porosity and the ordinate represents the thermal conductivity (in kcal/mh° C.) of the glass wool. A, B, C and D represent correlation curves of the cases of respectively 300°, 200°, 100° and 0° C. As a result, the porosity in the range of 0.98 to 0.95 was proper in the practical combination though somewhat different depending on the ambient temperature.

From the above results, it is found that, in the optimum combination of the multilayer heat insulator according to the present invention, in case the thermal conductivity of the heat insulator is about 0.02 kcal/mh° C., a thickness of the gas (air)-impermeable layer of 10 to 20 $\mu m$, a thickness of the gas (air)-containing layer of 0.3 to 1.8 mm and a porosity of 0.98 to 0.95 will be preferable.

Other materials which can be used to form gas (air)-containing layers (of a porosity of 0.98 to 0.95) than glass wool are asbestos fiber, mineral fiber, ceramic fiber, silica powder, alumina powder and zirconia powder. One or a compound of a plurality of them is used in the form of wool, paper or mat. For the gas (air)-impermeable layer, an aluminum foil is optimum at a using temperature of 100° to 300° C. At a maximum ambient temperature not less then 500° C., a foil of nickel or stainless steel may be used.

EXAMPLE 1

Figure 7:
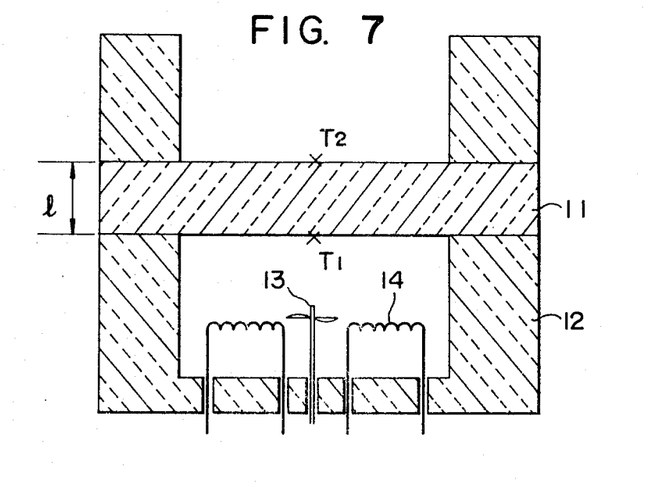
FIG. 7 is a schematic sectioned view of an essential part of a measuring apparatus for testing the heat insulating performance.

A multilayer heat insulator according to the present invention was experimentally made. In order to comparatively investigate the heat insulating performances of this heat insulator and a conventional heat insulator, the apparatus in FIG. 7 was assembled. In the apparatus, a heat insulator 11 to be measured was mounted on heat insulating layers 12 (made of fire bricks) and an electric fan 13 and electric heaters 14 were used as devices for feeding heat from one side of the heat insulator. As a comparatively measuring means, when the high temperature side was maintained at $T_1$ (in ° C.), the low temperature side temperature $T_2$ (in ° C.) was measured and the thickness $\lambda$ (in m) of the heat insulator used then was compared.

First, in the structure of the multilayer heat insulator, 20 aluminum foils (of a thickness of 15 $\mu m$ and weight of about 45 g/m² each) for gas (air)-impermeable layers and 20 sheets of ceramic paper (of a thickness of 0.4 mm, bulk density of 0.45 g/cm³ and porosity of 0.97 each) for gas (air)-containing layers alternately overlapped to be about 10 mm were used and the low temperature side temperature $T_2$ was measured as 60° C. when the high temperature side temperature $T_1$ was maintained at 300° C. On the other hand, by using rock wool (of a bulk density of 0.08 g/cm³) and ceramic wool (of a bulk density of 0.08 g/cm³) as generally used high temperature heat insulators, the insulator thickness $\lambda$ required to make the low temperature side temperature $T_2$ 60° C. when the high temperature side temperature $T_1$ was maintained at 300° C. was measured. As a result, the thickness of the rock wool was 50 mm and the thickness of the ceramic wool was 60 mm.

Therefore, it was confirmed that the multilayer insulator of the present invention could be made very thin (1/5 to 1/6 of the conventional insulator thickness) and showed the same performance as of the generally used high temperature heat insulator.

EXAMPLE 2

Figure 8A:
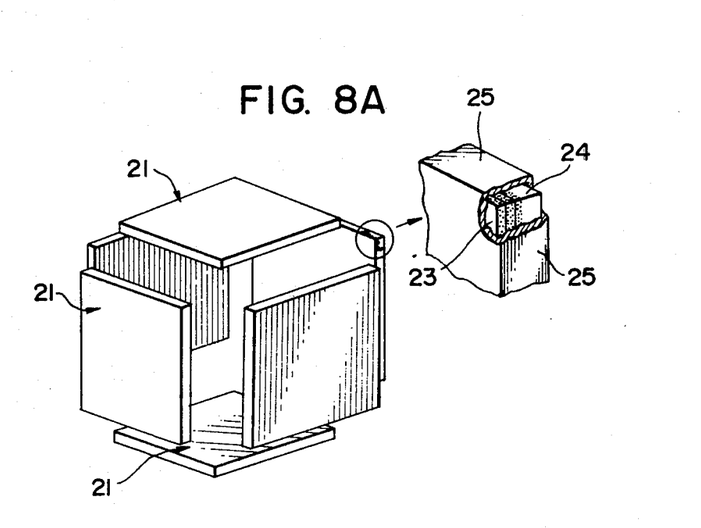
FIG. 8A is a flat plate type multilayer heat insulator.
Figure 8B:
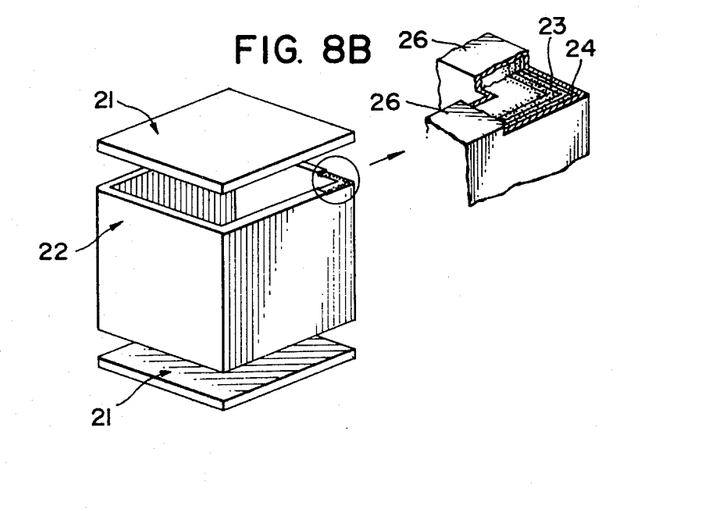
FIG. 8B is a wound type multilayer heat insulator.

The assembled formation of a multilayer heat insulator of the present invention is shown in FIGS. 8A and 8B. FIG. 8A shows a flat plate type system. A flat plate 21 is made by alternately overlapping gas (air)-impermeable layers 23 and gas (air)-containing layers 24 so that the same layers do not contact each other, has such insulating plates as of ceramics or mica contacted with it at both ends and is fixed in the peripheral parts 25 with a high temperature binder prepared by mixing, for example, asbestos fiber with water glass. FIG. 8B shows a wound type system. In a wound body 2, the gas (air)-impermeable layers 23 and gas (air)-containing layers 24 are wound to be alternately overlapped so that the same layers do not contact each other to form a box and the assembled layers are fixed in the peripheral side parts 26 (that is, upper and lower parts) with high temperature binder.

The flat plate type multilayer heat insulator can be easily made and is simple to assemble and replace but has a heat loss from the peripheral side parts (bonded fixed parts). Therefore, it is desirable to decrease the peripheral side parts of the multilayer heat insulator to be as few as possible. The wound type heat insulator is of a structure intended to reduce the heat loss. The heat loss in the structure shown in FIG. 8B was 15% less than in the structure shown in FIG. 8A. However, in this case, a combination of the same thickness was used for the same heated object.

EXAMPLE 3

Figure 9A:
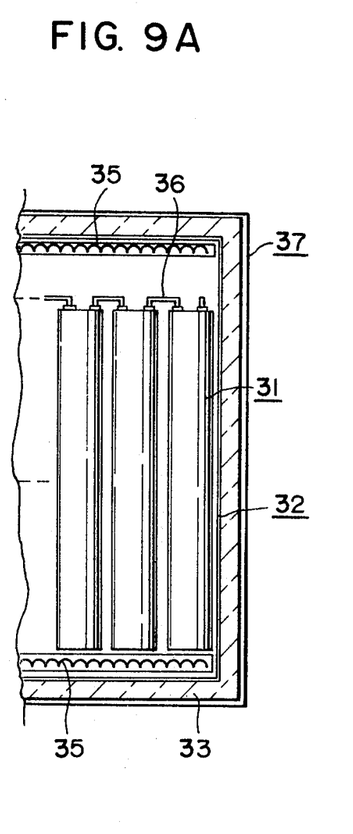
FIG. 9A is a comparative view of a sectional view of an essential part of the present invention as applied to a high temperature type sodium-sulfur battery.
Figure 9B:
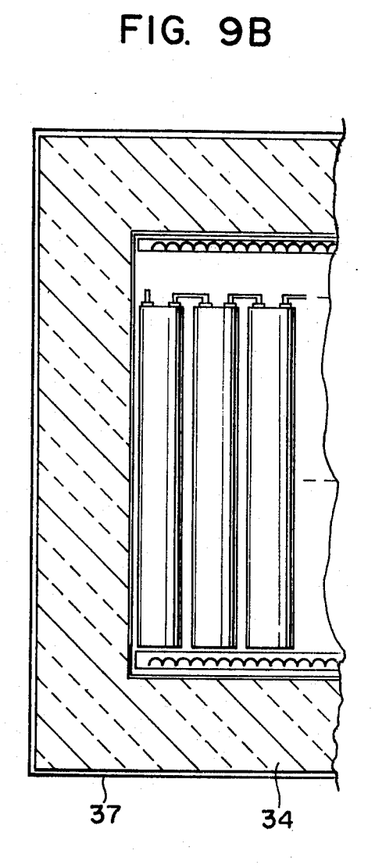
FIG. 9B is a sectional view of an essential part of the same battery in which a conventional heat insulator is used.

In the structure of a multilayer heat insulator, an aluminum foil (of a thickness of 15 $\mu$m) was used for the gas (air)-impermeable layer, glass wool (of a thickness of 1.0 mm, bulk density of 0.10 g/cm$^3$ and porosity of about 0.96) was used for the gas (air)-containing layer, 20 of each layer were alternately overlapped (to be of a total thickness of about 20 mm) so that the same layers might not contact each other to form a heat insulator. This multilayer heat insulator was adopted as a heat insulator for a high temperature type battery (sodium-sulfur battery of an operating temperature of 350+ C.). A combination of the flat plate and wound body was adopted for the combined structure of the multilayer heat insulator. (See Fig. 8B) The structure in which this is compared with a conventionally used mineral wool (rock wool) heat insulator is shown in FIGS. 9A and 9B. In FIG. 9B, 9A, 31 is a sodium-sulfur battery, 32 is a battery container, 33 is a heat insulator layer (shown in FIG. 9A) in case a multilayer insulator is used, 34 is a heat insulator layer (shown in FIG. 9B) in case a mineral wool (rock wool) heat insulator is used, 35 is an electric heater for maintaining the operating temperature and 36 is a battery output connecting line. The drawing is of the structure in case they are combined so that the thermal efficiency may be equal. In the case (A) of using the multilayer heat insulator of the present invention, the total volume of the battery reduced to be 66% of that in the case (B) of using the mineral wool heat insulator and could be made smaller.

In the present invention, it is important that the gas-impermeable foil layers of the same kind should not contact each other. If the foil layers of the same kind contact each other, the thermal conduction by the foil layers will be increased. Further, though metal foils of a high thermal conductivity are used, the heat insulating performance is improved by alternately overlapping the foil layers and heat insulating layers. Thus, by the foil layers, the behavior of the gas (air) contained in the heat insulating layers could be made as small as possible and the thermal conduction could be effectively prevented. It is preferable that the faces of the foil layers are arranged substantially at right angles with the direction in which heat insulation is intended.

In the above, some preferable embodiments of the present invention have been explained. However, it is needless to say that the present invention is not limited to them and can be variously modified without departing from the spirit of the present invention and the appended claims.

We claim:

1. A multilayer heat insulator, comprising: gas-impermeable layers each made of a metal foil of one member selected from the group consisting of aluminum, nickel and stainless steel; gas-containing layers each made of at least one member selected from the group consisting of glass fiber, ceramic fiber, carbon fiber, silica powder, alumina powder and zirconia powder in the form of wool, paper or mat; said gas-impermeable and gas-containing layers being laminated alternately so that the same layers are in non-contacting relationship with each other; the thickness of each gas-impermeable layer is 10 to 20 $\mu$m; the thickness of each gas-containing layer is 0.3 to 1.8 mm and has a porosity of 0.98 to 0.95 and a bulk density of 0.04 to 0.1 gm/cm$^3$ and weight per unit area of 0.02 to 0.05 g/cm$^2$ to make the thermal conductivity of this laminated multilayer heat insulator about 0.02 kcal/mh° C. (200° C.).

2. The multilayer heat insulator according to claim 1 wherein an aluminum foil is used for the gas-impermeable layer and glass wool is used for the gas-containing layer.

3. The multilayer heat insulator according to claim 1 wherein aluminum foils of a thickness of 15 $\mu$m each and glass wool of a thickness of 1.0 mm and porosity of about 0.96 are used to make the thermal conductivity of the multilayer heat insulator about 0.02 kcal/mh° C. (200° C.).

4. The multilayer heat insulator according to claim 1 wherein aluminum foils of a thickness of 15 $\mu$m each and ceramic paper of a thickness of 0.4 mm and porosity of about 0.97 are used to make the thermal conductivity of the multilayer heat insulator about 0.02 kcal/mh° C. (200° C.).

* * * * *